(12) United States Patent
Kobayashi et al.

(10) Patent No.: US 10,368,018 B2
(45) Date of Patent: Jul. 30, 2019

(54) IMAGE CAPTURING APPARATUS, CONTROL METHOD THEREFOR, IMAGE SENSOR, AND CONTROL METHOD THEREFOR

(71) Applicant: CANON KABUSHIKI KAISHA, Tokyo (JP)

(72) Inventors: Hirokazu Kobayashi, Tokyo (JP); Nobuhiro Takeda, Yokohama (JP); Ken Sasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 65 days.

(21) Appl. No.: 15/604,919

(22) Filed: May 25, 2017

(65) Prior Publication Data

US 2017/0353676 A1  Dec. 7, 2017

(30) Foreign Application Priority Data

Jun. 1, 2016  (JP) .................. 2016-110215

(51) Int. Cl.
*H04N 5/378*  (2011.01)
*H04N 5/357*  (2011.01)
(Continued)

(52) U.S. Cl.
CPC ........... *H04N 5/3572* (2013.01); *H04N 5/361* (2013.01); *H04N 5/3653* (2013.01);
(Continued)

(58) Field of Classification Search
CPC ............... H04N 5/3572; H04N 5/3742; H04N 5/37455; H04N 5/378; H04N 5/3698; H04N 5/3653; H04N 5/361
See application file for complete search history.

(56) References Cited

U.S. PATENT DOCUMENTS 8,059,180 B2   11/2011  Wang
8,139,132 B2    3/2012  Sonoda
(Continued)

FOREIGN PATENT DOCUMENTS

JP   2007-336343 A   12/2007
JP   2008-124527 A    5/2008
JP   2013-243781 A   12/2013

OTHER PUBLICATIONS

U.S. Appl. No. 15/608,470, filed May 30, 2017 (First named inventor: Hirozaku Kobayashi).
(Continued)

*Primary Examiner* — Abdelaaziz Tissire
(74) *Attorney, Agent, or Firm* — Venable LLP

(57) ABSTRACT

An image capturing apparatus comprises a pixel area having a plurality of pixels arranged in a matrix; output circuits that apply preset processing to signals read out in parallel from divided areas obtained by dividing the pixel area in a column direction and output the processed signals in parallel; a controller that performs control to execute first driving for reading out signals for obtaining correction data from the divided areas to the output circuits, and second driving for reading out image signals from the divided areas to the output circuits; and a correction circuit that obtains the correction data from the signals read out through the first driving and corrects the image signals using the correction data. The controller executes the first driving with respect to pixels in a part of rows that includes a row at a border of the divided areas.

18 Claims, 8 Drawing Sheets

(51) Int. Cl.
*H04N 5/369* (2011.01)
*H04N 5/3745* (2011.01)
*H04N 5/361* (2011.01)
*H04N 5/365* (2011.01)
*H04N 5/374* (2011.01)

(52) U.S. Cl.
CPC ........... *H04N 5/3698* (2013.01); *H04N 5/378* (2013.01); *H04N 5/3742* (2013.01); *H04N 5/37455* (2013.01)

(56) References Cited

U.S. PATENT DOCUMENTS

| | | | |
|---|---|---|---|
| 8,570,415 B2 | 10/2013 | Takeda | |
| 8,582,009 B2 | 11/2013 | Kono et al. | |
| 8,692,917 B2 | 4/2014 | Takeda | |
| 8,970,757 B2 | 3/2015 | Kobayashi | |
| 9,030,589 B2 | 5/2015 | Sasaki et al. | |
| 2007/0103569 A1 | 5/2007 | Kawahito | |
| 2007/0285518 A1* | 12/2007 | Ikeda | H04N 5/37213 348/207.99 |
| 2008/0211942 A1* | 9/2008 | Kosover | H04N 5/3653 348/294 |
| 2009/0079859 A1* | 3/2009 | Hagiwara | H04N 9/045 348/311 |
| 2010/0128150 A1 | 5/2010 | Taguchi | |
| 2010/0128158 A1* | 5/2010 | Wang | H04N 5/3653 348/311 |
| 2011/0233702 A1* | 9/2011 | Takahashi | H01L 21/76898 257/432 |
| 2013/0063640 A1* | 3/2013 | Sugiyama | H04N 5/3742 348/302 |
| 2015/0304578 A1 | 10/2015 | Okura et al. | |
| 2017/0111599 A1 | 4/2017 | Saito et al. | |
| 2017/0353674 A1* | 12/2017 | Kobayashi | H04N 5/23209 |

OTHER PUBLICATIONS

U.S. Appl. No. 15/618,375, filed Jun. 9, 2017 (First Named Inventor: Hideki Ikedo).

* cited by examiner

IMAGE CAPTURING APPARATUS, CONTROL METHOD THEREFOR, IMAGE SENSOR, AND CONTROL METHOD THEREFOR

BACKGROUND OF THE INVENTION

Field of the Invention

The present invention relates to an image capturing apparatus, a control method therefore, an image sensor, and a control method therefore, and especially to an image capturing apparatus, a control method therefore, an image sensor, and a control method therefore that can perform readout from a pixel area that is divided into a plurality of areas.

Description of the Related Art

In recent years, demand for a large number of pixels and high frame rate has led to proposals for various techniques to further increase a readout speed in the field of image sensors. Japanese Patent Laid-Open No. 2013-243781 discloses an image sensor that includes, for example, a plurality of pixel circuits, which are arranged two-dimensionally and have photoelectric converters, amplification transistors, and selection transistors, and a plurality of vertical signal lines. The plurality of pixel circuits are divided into groups in a column direction, and each of the plurality of vertical signal lines can drive pixel circuits in a corresponding group individually, and is connected to an AD conversion circuit; in one example, pixel circuits are driven sequentially on a row-by-row basis, in a direction away from a row in which divided pixel circuits neighbor one another. As such vertical signal lines are divided, the parasitic resistance and parasitic capacitance are halved compared with a case in which undivided vertical signal lines are used, and hence a settling time in transmission of signal voltages from the pixel circuits to the vertical signal lines is shortened, which contributes to high-speed readout in the analog signal stage. Techniques that contribute to high-speed readout in the AD conversion stage and the digital signal stage have also been proposed, although the details will be omitted as these known techniques exist in various forms.

On the other hand, as such divided vertical signal lines are connected to different AD conversion circuits, pixel signals at the border between the divided vertical signal lines exhibit characteristic differences. Especially because the characteristic differences emerge in the vicinity of the center of a shot image seamlessly between columns, the characteristic differences are noticeable and exceed a perceptible limit of a viewer even if they are minute.

Techniques for high-precision correction of image sensor signals on a column-by-column basis have been conventionally proposed. Japanese Patent Laid-Open No. 2007-336343 discloses the following image data correction apparatus. First, the apparatus calculates one-dimensional shading correction data by integrating pixel data of optical black pixel regions of an image sensor on a column-by-column basis. Then, when reading out pixel data from an aperture pixel area of the image sensor, the apparatus corrects one-dimensional dark shading of the image sensor using the calculated one-dimensional dark shading correction data.

However, in an image sensor with divided vertical signal lines, it is obviously difficult to place optical black pixel regions in the vicinity of pixels at the border between the divided vertical signal lines to perform high-precision correction as described in Japanese Patent Laid-Open No. 2007-336343. On the other hand, placing the optical black pixel regions near, for example, AD conversion circuits gives rise to the following problem. As pixels used in calculation of one-dimensional shading correction data are quite distant from the pixels at the border between the divided vertical signal lines, error caused by a temperature distribution on a surface of the image sensor, offset level differences, and the like is easily added to correction data.

SUMMARY OF THE INVENTION

The present invention has been made in consideration of the above situation, and in the case of an image sensor that performs readout from a pixel area divided in a vertical direction, the present invention corrects differences in dark shading at the border of divided areas with high precision.

According to the present invention, provided is an image capturing apparatus comprising: a pixel area composed of a plurality of pixels arranged in a matrix; a plurality of output circuits that apply preset processing to signals which are read out in parallel from a plurality of divided areas obtained by dividing the pixel area in a column direction and output the processed signals; a controller that performs control to execute first driving for reading out signals for obtaining correction data from the divided areas to the output circuits, and second driving for reading out image signals from the divided areas to the output circuits; and a correction circuit that obtains the correction data from the signals which are read out through the first driving, and corrects the image signals using the correction data, wherein the controller executes the first driving with respect to pixels in a part of rows that includes a row at a border of the divided areas.

Further, according to the present invention, provided is an image sensor comprising: a pixel area composed of a plurality of pixels arranged in a matrix; a plurality of output circuits that apply preset processing to signals which are read out in parallel from a plurality of divided areas obtained by dividing the pixel area in a column direction and output the processed signals; a controller that performs control to execute first driving for reading out signals for obtaining correction data from the divided areas to the output circuits, and second driving for reading out image signals from the divided areas to the output circuits; and a plurality of correction circuits that are provided in one-to-one correspondence with the divided areas, obtain the correction data from the signals which are read out through the first driving, and correct the image signals using the correction data, wherein the controller executes the first driving with respect to pixels in a part of rows that includes a row at a border of the divided areas.

Furthermore, according to the present invention, provided is a control method for an image capturing apparatus provided with an image sensor that includes a pixel area and a plurality of output circuits, the pixel area being composed of a plurality of pixels arranged in a matrix, the output circuits applying preset processing to signals which are read out in parallel from a plurality of divided areas obtained by dividing the pixel area in a column direction and outputting the processed signals, the control method comprising: controlling to execute first driving for reading out signals for obtaining correction data from the divided areas to the output circuits, and second driving for reading out image signals from the divided areas to the output circuits; and obtaining the correction data from the signals which are read out through the first driving, and correcting the image signals using the correction data, wherein in the control, the first driving is executed with respect to pixels in a part of rows that includes a row at a border of the divided areas.

Further, according to the present invention, provided is a control method for an image sensor that includes a pixel area and a plurality of output circuits, the pixel area being composed of a plurality of pixels arranged in a matrix, the output circuits applying preset processing to signals which are read out in parallel from a plurality of divided areas obtained by dividing the pixel area in a column direction and outputting the processed signals, the control method comprising: performing control to execute first driving for reading out signals for obtaining correction data from the divided areas to the output circuits, and second driving for reading out image signals from the divided areas to the output circuits; and for each of the divided areas, obtaining the correction data from the signals which are read out through the first driving, and correcting the image signals using the correction data, wherein in the control, the first driving is executed with respect to pixels in a part of rows that includes a row at a border of the divided areas.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings.

First Embodiment

Figure 1:
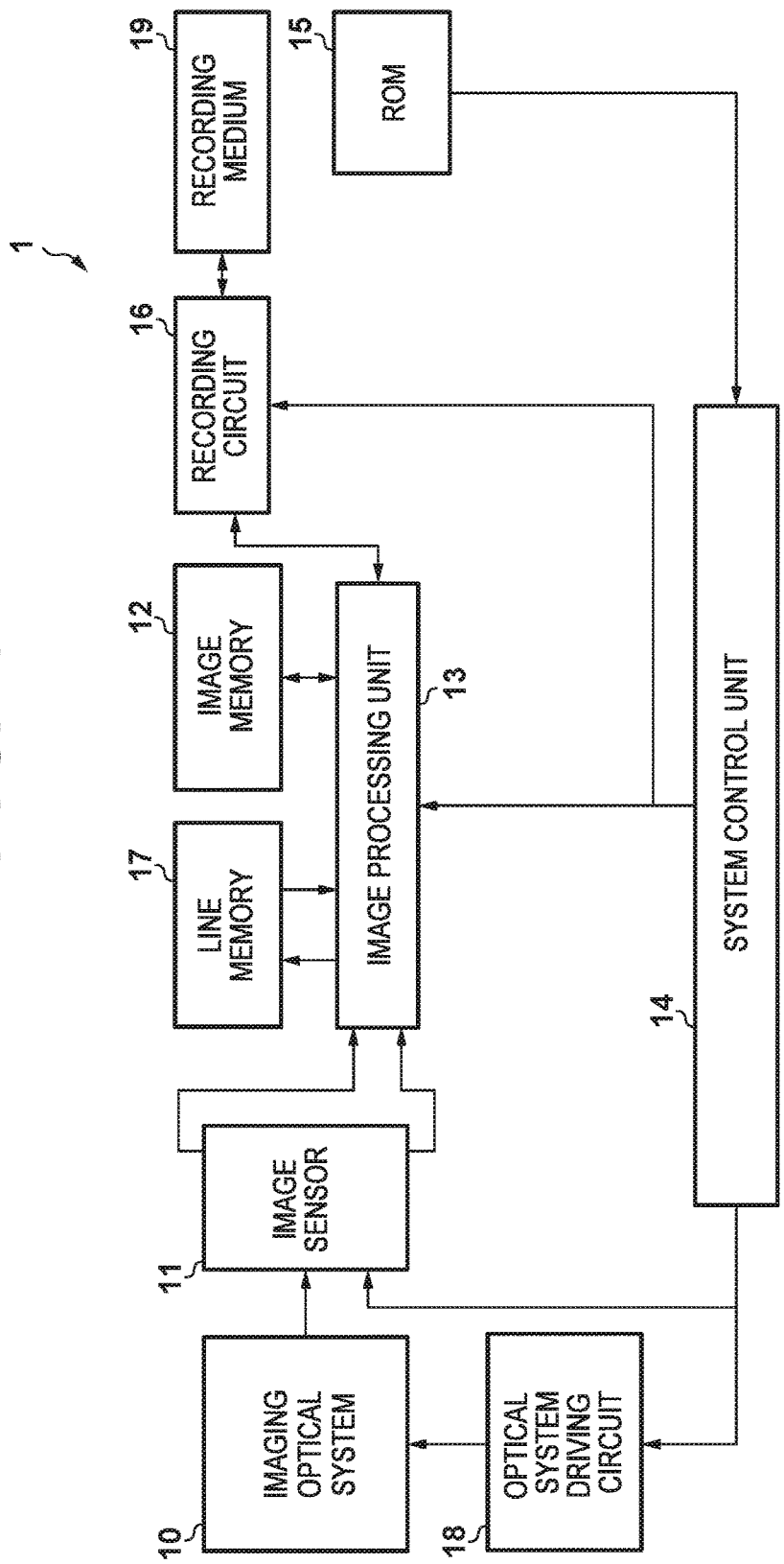
FIG. 1 is a block diagram showing a schematic configuration of an image capturing apparatus according to a first embodiment of the present invention.

FIG. 1 is a block diagram showing a schematic configuration of an image capturing apparatus 1 according to a first embodiment of the present invention. In FIG. 1, a system control unit 14 is an overall control unit that executes control programs for controlling the entirety of the image capturing apparatus 1. The control programs may be stored in a ROM 15 in whole or part, and may be configured such that one or more necessary programs are read out and executed for each individual control mode. Specific addresses indicating defects are also recorded in the ROM 15, and used in calculation of one-dimensional dark shading data used in correction processing.

Upon accepting an instruction related to a diaphragm, zooming, focusing, and the like from a user via a non-illustrated console unit, the system control unit 14 operates an imaging optical system 10 via an optical system driving circuit 18, specifically, performs intended control and opens/closes a non-illustrated shield, such as a mechanical shutter.

An image sensor 11 receives light formed by the controlled imaging optical system 10, performs photoelectric conversion, and generates digital image signals by applying AD conversion to voltage signals obtained through the photoelectric conversion. The image sensor 11 performs a sequence of driving operations as the system control unit 14 selects and sets a driving pattern for a later-described timing generation circuit (TG) 22. In the first embodiment, as will be described later, vertical signal lines of the image sensor 11 are each divided into two in a column direction, and AD conversion is performed on voltage signals output via the divided vertical signal lines in parallel, sequentially on a row-by-row basis; thus, digital image signals corresponding to two rows are transferred to an image processing unit 13.

The digital image signals output by the image sensor 11 are temporarily stored as a group of signals to an image memory 12 on a frame-by-frame basis, or cumulatively stored to a line memory 17 on a row-by-row basis for calculation of one-dimensional dark shading data. Upon completion of transfer from the number of rows necessary for calculation of one-dimensional dark shading data, defect reduction processing, averaging processing, and the like are applied to data cumulatively stored in the line memory 17, and correction involving subtraction from image data to be stored to the image memory 12 is performed, as will be described later in detail. After the correction involving subtraction, digital image signals corresponding to one frame are temporarily stored to the image memory 12, and then an image processing unit 13 executes predetermined image processing.

Examples of the image processing executed by the image processing unit 13 include the aforementioned correction involving subtraction, composition of divided elements, white balance correction, synchronization processing, noise reduction, and sharpness adjustment.

Images to which the image processing has been applied by the image processing unit 13 are compressed by a recording circuit 16 to conform to the image standard of Joint Photographic Experts Group (JPEG) and the like, and then recorded to a recording medium 19.

Figure 2:
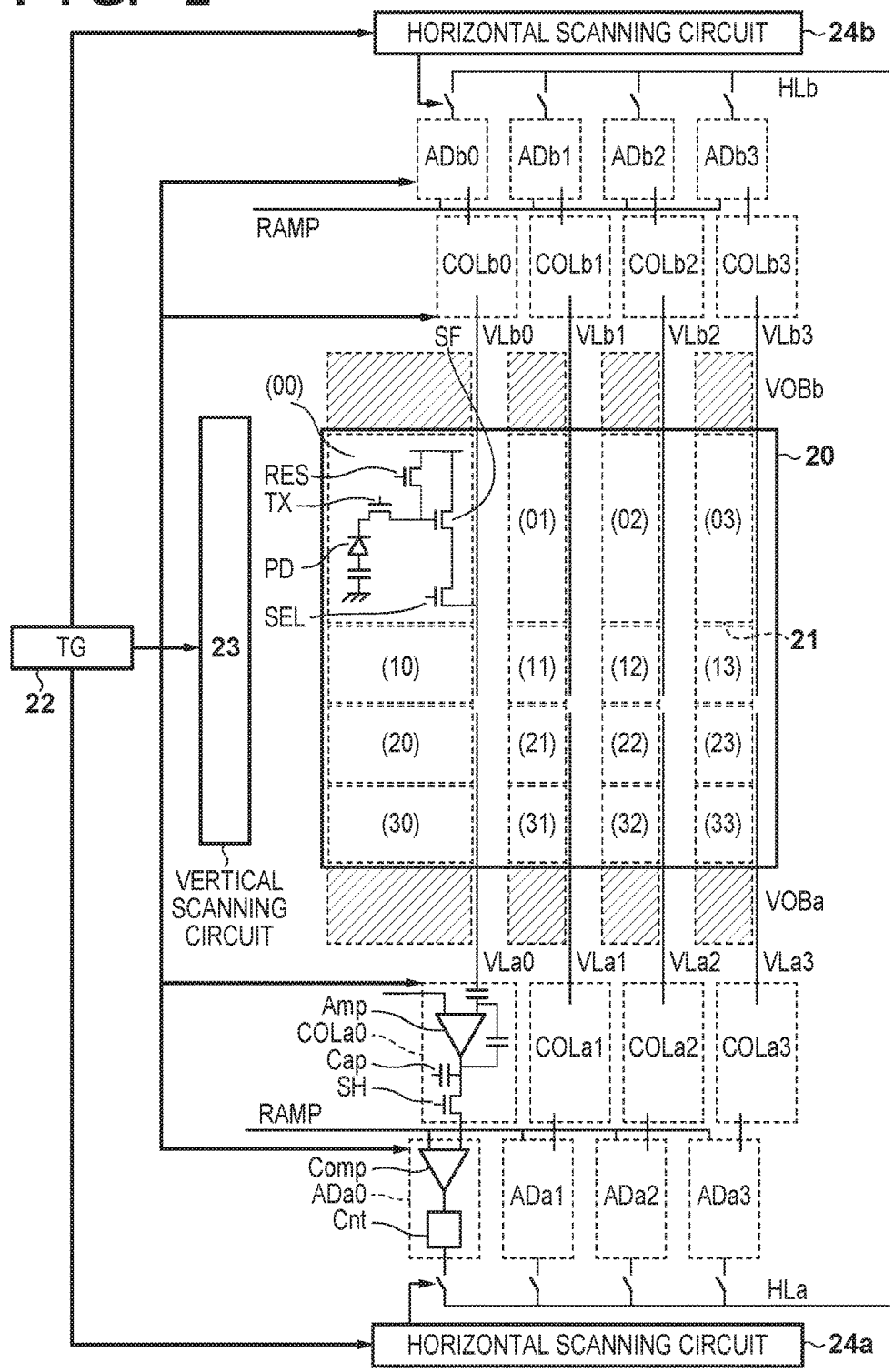
FIG. 2 is a block diagram showing a configuration of an image sensor according to the first embodiment.

FIG. 2 is a block diagram showing a configuration of the image sensor 11 according to the first embodiment. FIG. 2 shows pixels 21 arranged in a matrix of four rows and four columns as pixels composing an aperture pixel area 20 (a pixel area). Hereinafter, under the assumption that a row is denoted by "p" and a column is denoted by "q," a pixel 21($pq$) denotes a pixel in the $p^{th}$ row and the $q^{th}$ column; for example, a pixel 21(00) denotes a pixel in the $0^{th}$ row and the $0^{th}$ column. Although FIG. 2 shows only 16 pixels, oftentimes there are tens of millions of pixels in practice.

In each pixel 21, light incident thereon via the imaging optical system 10 is converted into charges corresponding to a light amount by a photodiode PD (a photoelectric converter). A transfer transistor TX transfers the charges generated by the photodiode PD to a transfer node including a gate of an amplification transistor SF composing a source follower. A reset transistor RES is used to reset the transfer node to a predetermined voltage. The photodiode PD can be reset by turning ON the reset transistor RES and the transfer transistor TX simultaneously. A selection transistor SEL is connected to an output node including a drain of the amplification transistor SF, and outputs a voltage of the output node to a later-described vertical signal line VL when a pertinent row is selected.

A vertical scanning circuit 23 controls the transfer transistors TX, reset transistors RES, and selection transistors SEL concurrently in a horizontal direction at their respective predetermined timings, and also controls them sequentially in a column direction; consequently, the pixels 21 are driven and controlled on a row-by-row basis.

Vertical signal lines VL are each divided into an upper wire and a lower wire, which are denoted by VLbq and VLaq, respectively, in FIG. 2. Therefore, a set of the divided vertical signal lines VLaq and a set of the divided vertical signal lines VLbq each enable signal readout on a row-by-row basis; that is, signals from two rows can be read out simultaneously. Hereinafter, the components that process signals output to the vertical signal lines VLaq (i.e., signals from the lower half of the pixel area) will be assigned a reference sign "a," whereas the components that process signals output to the vertical signal lines VLbq (i.e., signals from the upper half of the pixel area) will be assigned a reference sign "b." Also, the lower half of the pixel area denoted by "a" will be referred to as an "a-area," whereas the upper half of the pixel area denoted by "b" will be referred to as a "b-area." In FIG. 2, each column is divided into the a-area and the b-area, with the pixels 21(1q) in the second row and the pixels 21(2q) in the third row serving as a border region. Voltages corresponding to the charges generated by the photodiodes PD are transmitted to column circuits COLaq and COLbq via the vertical signal lines VLaq and VLbq, respectively.

In each of the column circuits COLaq and COLbq, a difference voltage indicating a difference from a non-illustrated reference voltage is amplified by an amplification circuit Amp arranged with negative feedback through a predetermined capacitance, and the amplified voltage is temporarily stored to an accumulation unit Cap. Furthermore, a readout control transistor SH for reading out the amplified voltage from the accumulation unit Cap is provided. The column circuits COLaq and COLbq transmit the amplified voltages to AD conversion circuits ADaq and ADbq.

The AD conversion circuits ADaq and ADbq each includes a comparator Comp that compares the voltage output by the column circuit COLaq or COLbq with a RAMP signal that increases or decreases in proportion to time, and a counter circuit Cnt with an Enable terminal to which the output from the comparator Comp is input. The counter circuit Cnt can obtain a digital count value corresponding to the charges generated by the photodiode PD by performing a count operation under later-described predetermined control in accordance with the result of comparison between the RAMP signal and the voltage output by the column circuit COLaq or COLbq. This enables analog-to-digital conversion.

Two horizontal scanning circuits 24*a* and 24*b* each read out digital image capture signals corresponding to one row by sequentially selecting, in the horizontal direction, the digital count values output by the AD conversion circuits ADaq or ADbq, and transferring them to a horizontal signal line HLa or HLb.

The timing generation circuit (TG) 22 generates timing signals for sequentially controlling the vertical scanning circuit 23, horizontal scanning circuits 24*a* and 24*b*, AD conversion circuits ADaq and ADbq, and so forth. The timing signals may be generated by, for example, causing the system control unit 14 to select one of several patterns stored in the ROM 15.

Optical black pixel regions VOBa and VOBb are each placed adjacent to the aperture pixel area 20 and the column circuits COLaq or COLbq. For example, pixels that are basically configured in the same manner as the pixels 21 but include photodiodes PD having a shield structure, or include no photodiode PD, have been proposed as pixels that compose the optical black pixel regions VOBa and VOBb.

Figure 3:
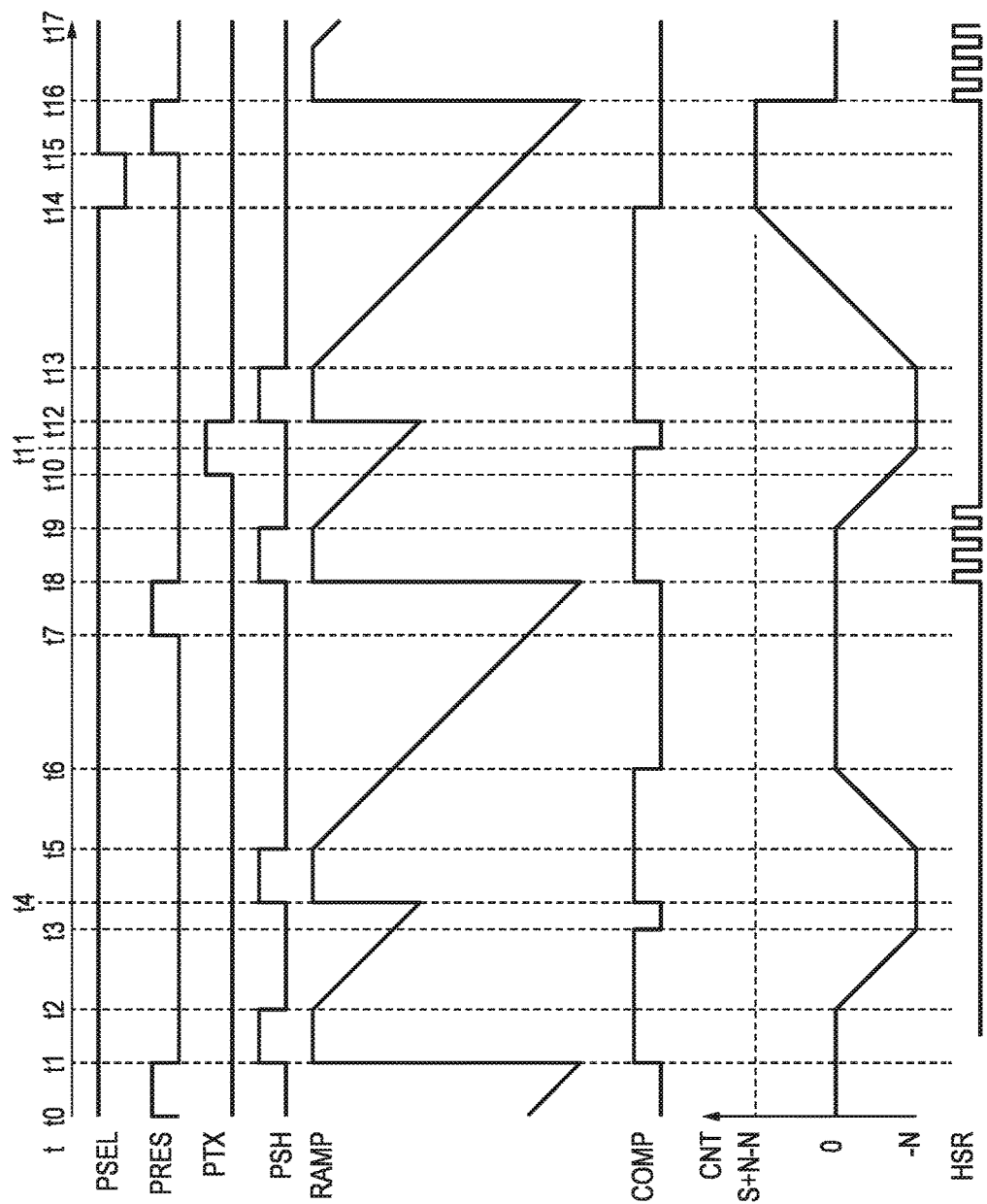
FIG. 3 is a timing chart showing a method of driving the image sensor according to the first embodiment.

FIG. 3 is a timing chart showing timings for driving the pixels 21 at the border of divided areas in the first embodiment. In the first embodiment, correction values are obtained by driving, among the pixels 21 in the aperture pixel area 20, the pixels 21 in the second and third rows at the border of divided areas, that is, the border between the vertical signal lines VLaq and the vertical signal lines VLbq. Thereafter, image signals are read out from all of the pixels 21, including the pixels 21 in the second and third rows.

In FIG. 3, a selection signal PSEL, a reset signal PRES, and a transfer signal PTX denote signals that are applied to the gates of the selection transistors SEL, reset transistors RES, and transfer transistors TX in the pixels 21(*pq*), respectively. Each transistor is ON during a Hi period of the corresponding signal, and OFF during a Lo period of the corresponding signal.

A control signal PSH denotes a signal applied to the gates of the readout control transistors SH in the column circuits COLaq and COLbq, and the readout control transistors SH are ON during a Hi period of the control signal PSH, and OFF during a Lo period of the control signal PSH. RAMP denotes the RAMP signal, COMP denotes the output from the comparators Comp, and CNT denotes a count value from the counter circuits Cnt. HSR denotes a horizontal scanning signal generated by the horizontal scanning circuits 24*a* and 24*b*.

From time t0 to time t1, the reset signal PRES is placed into a Hi state, thereby turning ON the reset transistors RES and resetting the transfer nodes to a predetermined power supply voltage. Thereafter, at time t1, the reset transistors RES are turned OFF, and the transfer nodes are placed into a floating state. Meanwhile, as the selection signal PSEL is in a Hi state, the voltage of the transfer nodes in the pixels 21(1q) and the voltage of the transfer nodes in the pixels 21(2q) (hereinafter, "reference voltage N1") are output to the vertical signal lines VLaq and VLbq, respectively, via the selection transistors SEL. Then, the reference voltage N1 is amplified by the amplification circuits Amp in the column circuits COLaq and COLbq.

By time t2, the readout control transistors SH that perform readout from the accumulation units Cap in the column circuits COLaq and COLbq are turned ON and then OFF, to set the voltage (reference level N1) obtained by amplifying the reference voltage N1 as the voltage to be transmitted to the AD conversion circuits ADaq and ADbq. Then, at time t2, the RAMP signal is generated, and AD conversion of the reference level N1 is performed by counting an elapsed period until the RAMP signal becomes equal to the reference level N1 with use of the counter circuits Cnt. At time t2, the reference level N1 is smaller than the RAMP signal, and thus the output from the comparators Comp is Hi. The counter circuits Cnt operate using this output from the comparators Comp as an Enable signal.

At time t3, the reference level N1 becomes equal to or larger than the RAMP signal, and the output from the comparators Comp changes into Lo. As a result, the counter circuits Cnt are placed in a stopped state, and AD conversion of the reference level N1 is automatically ended. Note that during AD conversion of the reference level N1, which starts at time t2, the counter circuits Cnt perform counting down.

Then, by time t5, the readout control transistors SH that perform readout from the accumulation units Cap in the column circuits COLaq and COLbq are turned ON and then OFF again while the transfer signal PTX is maintained in a Lo state, that is, without transferring signal charges from the photodiodes PD to the transfer nodes. As a result, the voltage (noise level N2) resulting from amplification of a voltage N2, which is obtained by adding noise corresponding to a period between time t1 and time t5 to the reference voltage N1, is set as a voltage to be transmitted to the AD conversion circuits ADaq and ADbq. Then, at time t5, the RAMP signal is generated, and AD conversion of the noise level N2 is performed by counting an elapsed period until the RAMP signal becomes equals to the noise level N2. As the counter circuits Cnt have performed counting down to the reference level N1, they each start counting up at time t5 to obtain a difference between the reference level N1 and the noise level N2, that is, a count value corresponding to noise components, at time t6 at which the counting is ended. This count value corresponding to the noise components is used as a correction value.

In the foregoing driving for obtaining the correction values, readout of the voltage of the transfer nodes is performed twice at an interval of a predetermined period, and a difference between a signal that was read out in the second readout and a signal that was read out in the first readout (noise) is digitalized; thus, the correction values should be zero if there is no time-based change (noise). However, the correction values do not become zero due to the presence of one-dimensional dark shading data represented by, for example, column-to-column differences attributed to an offset difference between an amplification circuit Amp in one column and an amplification circuit Amp in another column, variations in the capacities of the accumulation units Cap for temporary storage, variations in the thresholds of the readout control transistors SH, and so forth.

Then, from time t8 to time t10, the horizontal scanning signal is generated to sequentially select, in the horizontal direction, the correction values obtained through AD conversion. As a result, the correction values composing the one-dimensional dark shading data are sequentially transferred to the horizontal signal lines HLa and HLb on a column-by-column basis, and accumulated in the line memory 17 separately for the a-area and the b-area.

Note that the foregoing driving for obtaining the correction values may be performed multiple times. In this case, readout from the pixels at the border of divided areas may be performed multiple times. Furthermore, as the reference level may change between time t2 and time t5 due to the influence of, for example, minute leakage of charges from the transistors composing the pixels at the border of divided areas, the driving for obtaining the correction values may be performed multiple times with a selection of a plurality of rows in the vicinity of the pixels at the border of divided areas.

Once the foregoing driving for obtaining the correction values has been ended, optical signals are read out from the pixels at the border of divided areas while these pixels are maintained in a selected state, without changing the polarity of the selection signal PSEL.

First, from time t7 to time t8, the reset signal PRES is placed into a Hi state, thereby turning ON the reset transistors RES and resetting the transfer nodes to the predetermined power supply voltage. At time t8, the reset transistors RES are turned OFF, and the transfer nodes are placed into the floating state. Meanwhile, as the selection signal PSEL is in the Hi state, the voltage of the transfer nodes is transmitted to the vertical signal lines VLaq and VLbq via the selection transistors SEL. This voltage (reference voltage N1) is amplified by the amplification circuits Amp in the column circuits COLaq and COLbq.

By time t9, the readout control transistors SH that perform readout from the accumulation units Cap in the column circuits COLaq and COLbq are turned ON and then OFF, to set the voltage (reference level N1) obtained by amplifying the reference voltage N1 as the voltage to be transmitted to the AD conversion circuits ADaq and ADbq. Then, at time t9, the RAMP signal is generated, and AD conversion of the reference level N1 is performed by counting an elapsed period until the RAMP signal becomes equal to the reference level N1 with use of the counter circuits Cnt. At time t9, the reference level N1 is smaller than the RAMP signal, and thus the output from the comparators Comp is Hi. The counter circuits Cnt operate using this output from the comparators Comp as an Enable signal.

At time t11, the reference level N1 becomes equal to or larger than the RAMP signal, and the output from the comparators Comp changes into Lo. As a result, the counter circuits Cnt are placed in the stopped state, and AD conversion of the reference level N1 is automatically ended. Note that before time t9 at which AD conversion of the reference level N1 starts, the counter circuits Cnt are reset to 0, and then start counting down.

On the other hand, from time t10 to time t12, the transfer signal PTX is placed into a Hi state, thereby turning ON the transfer transistors TX and transferring light charges generated by the photodiodes PD to the transfer nodes. A reduction in the voltage of the transfer nodes, which occurs in accordance with the light charges, is reflected by the voltage of the vertical signal lines VLaq and VLbq. This voltage is amplified by the amplification circuits Amp in the column circuits COLaq and COLbq, similarly to the reference level N1.

At time t12, the RAMP signal is generated, and AD conversion of a signal level is performed while counting an elapsed period until the RAMP signal becomes equal to a signal voltage obtained by summing the amplified voltage S corresponding to the light charges and the voltage N2 corresponding to the noise level N2. At this time, the counter circuits Cnt perform counting up from the count value obtained by performing counting down to the reference level N1. Therefore, at time t14 at which the counting is ended, a count value is obtained as a result of AD conversion of a sum of the voltage S corresponding to the light charges and a difference between the noise level N2 and the reference level N1, that is, a voltage corresponding to noise components.

Then, from time t16 to time t17, the horizontal scanning signal is generated to sequentially select, in the horizontal direction, count values of light levels S after AD conversion. As a result, digital image capture signals corresponding to one row are sequentially transferred to each of the horizontal signal lines HLa and HLb on a column-by-column basis. Note that digital signals on the horizontal signal lines HLa and HLb are output in a format of high-speed serial signals, such as low-voltage differential signals (LVDS).

The selection signal PSEL is placed into a Lo state in an arbitrary period between time t13 and time 15, specifically in a period from time t14 to time t15 in FIG. 3. This turns OFF the selection transistors SEL, and ends the selection of the pixels at the border of divided areas; as a result, pixels away from the border of divided areas, for example, the pixels 21(0q) and the pixels 21(3q) in the next scanning rows, will be selected in sequence. Driving similar to the aforementioned signal readout driving from time t7 to t16 is repeated for the rows selected next. Note that in the driving from time t7 to time t16, obtained count values correspond to a difference voltage indicating a difference between the voltage S corresponding to the light charges and the reference voltage N1, rather than a difference voltage indicating a difference between the voltage S and the noise voltage N2.

In the first embodiment, it is sufficient to obtain one-dimensional dark shading data for correction of column-to-column differences from the pixels at the border of divided areas. Therefore, the driving for obtaining the correction values may be performed after light shielding by the mechanical shutter included in the imaging optical system 10 of the image capturing apparatus, or before the start of exposure. In this case, the transfer signal PTX may be turned ON by time t4, and a level including a voltage corresponding to the light charges may be used as the reference level. Such driving for obtaining the correction values, which involves light shielding by the mechanical shutter, is more suitable for a still image mode than for a moving image mode in which signal charges are constantly generated.

Figure 4:
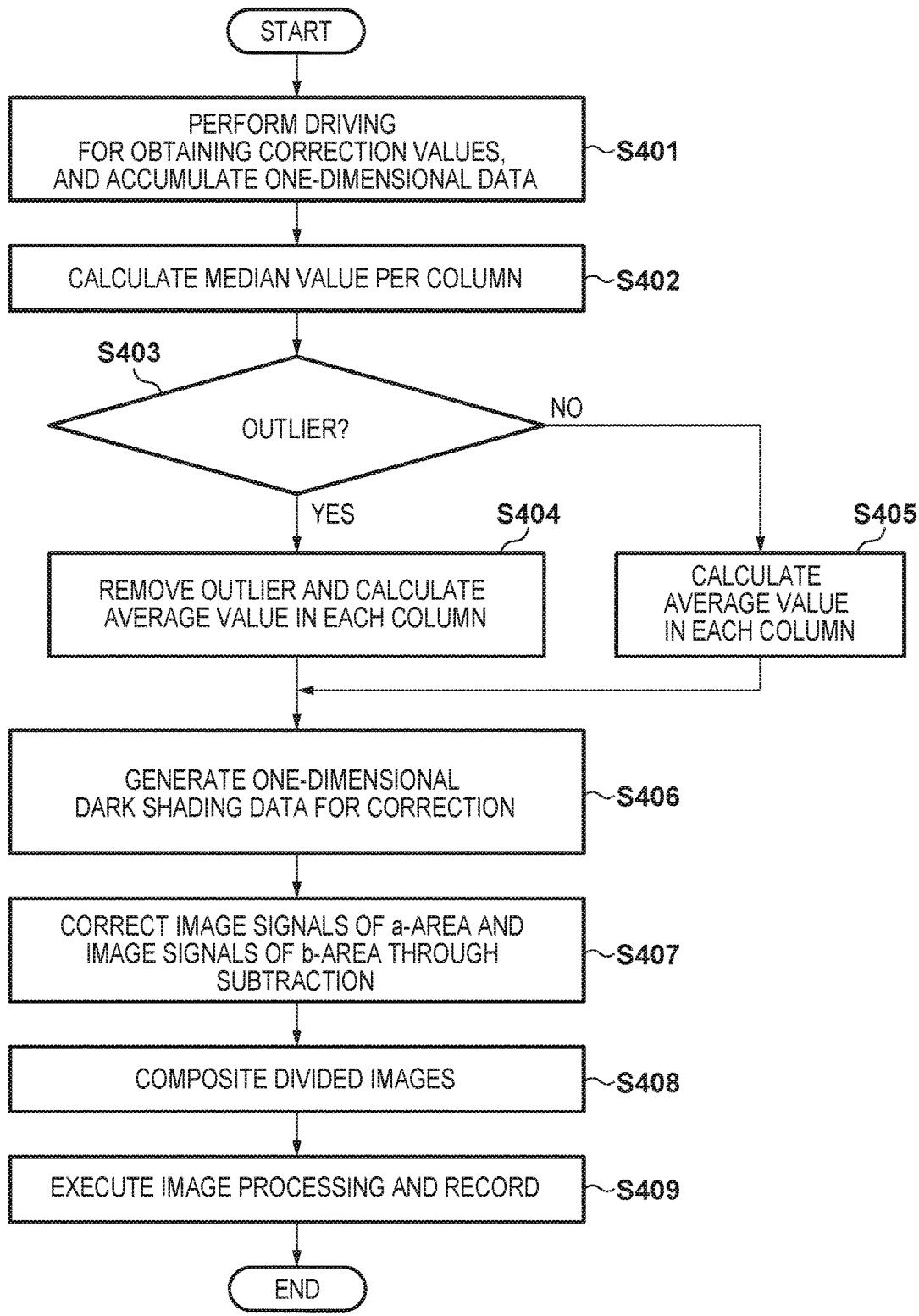
FIG. 4 is a flowchart of correction processing executed by the image capturing apparatus according to the first embodiment.

A description is now given of a correction operation that is performed using one-dimensional dark shading data accumulated in the line memory 17 in the above-described manner. FIG. 4 is a flowchart of correction processing executed by the image capturing apparatus 1 according to the first embodiment.

First, in step S401, one-dimensional dark shading data is obtained through the above-described driving for obtaining the correction values. It will be assumed that a plurality of pieces of one-dimensional dark shading data are obtained per column by performing the driving for obtaining the correction values multiple times with respect to pixels at the border of divided areas, or by performing the driving for obtaining the correction values with respect to pixels near the border of divided areas. The pieces output via the vertical signal lines VLaq and the pieces output via the vertical signal lines VLbq are accumulated in the line memory 17 in two different groups, respectively. Upon completion of the accumulation, a median value is calculated per column in step S402.

It is known that random telegraph signal noise and the like make the obtained correction values variant with a predetermined probability. In view of this, favorable correction effects are achieved by removing the variant correction values as outliers. Thus, in step S403, outliers are detected based on the median values. That is, the image processing unit 13 determines whether a difference between the median value and the accumulated data exceeds a predetermined threshold on a column-by-column basis. If there is any outlier in a target column, the processing proceeds to step S404 in which the outlier is removed and an average value is obtained. If there is no outlier in a target column, the processing proceeds to step S405 in which a normal average value is obtained. If a change in the reference level caused by the influence of, for example, minute leakage from the transistors composing the pixels at the border of divided areas is evident between time t2 and time t5 of FIG. 3, the corresponding column coordinate and the amounts of change may be recorded to the ROM 15 and used in a subtraction process.

In step S406, one-dimensional dark shading data for correction is generated by combining the average values obtained in one-to-one correspondence with the columns. When one-dimensional dark shading data is obtained only from pixels in one row at the border of divided areas, the processes of S402 to S406 are unnecessary.

In step S407, image signals of the a-area and image signals of the b-area, which have been obtained through the above-described readout driving and temporarily stored in the image memory 12, are corrected by subtracting the corresponding one-dimensional dark shading data for correction therefrom on a column-by-column basis. As a result, characteristic differences at the border of divided areas are rendered unnoticeable.

In step S408, divided images are composited into a single image. In step S409, the image processing unit 13 executes image processing, such as defect correction, white balancing, tone conversion, synchronization processing, and noise reduction, and records the resultant image to the predetermined recording medium 19 via the recording circuit 16.

As described above, in the first embodiment, driving for obtaining correction values for one-dimensional dark shading in divided areas is performed with respect to pixels covering the border set for the vertical signal lines, that is, the border of divided areas, and the correction values are converted into one-dimensional dark shading data for correction via, for example, the line memory of the image capturing apparatus. Image signals of the divided area, which are output from the divided vertical signal lines, are corrected by subtracting the one-dimensional dark shading data for correction therefrom; as a result, signal level differences at the border set for the vertical signal lines, that is, the border of divided areas, are rendered unnoticeable.

Second Embodiment

A second embodiment of the present invention will now be described. In the second embodiment, a difference between sets of one-dimensional shading data obtained by performing the driving for obtaining the correction values with respect to pixels near the border set for the vertical signal lines VLaq and VLbq, that is, the border of divided areas, is generated in advance, and stored to the line memory 17 of the image capturing apparatus 1. One of divided images output from the horizontal signal lines HLa and HLb is corrected by subtracting the difference therefrom. This can reduce the load on and power consumption of processing executed by the image processing unit 13.

Figure 5:
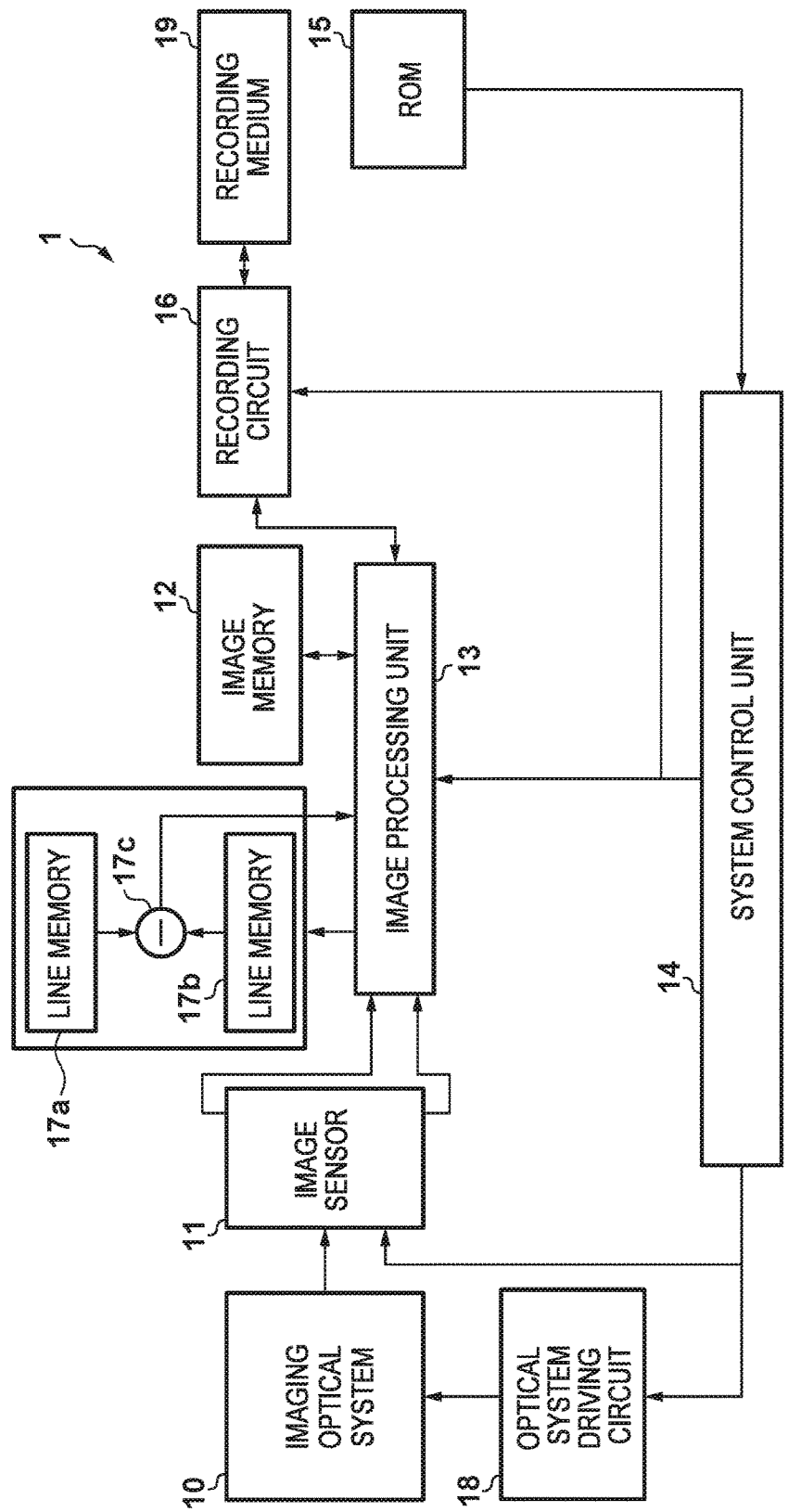
FIG. 5 is a block diagram showing a schematic configuration of an image capturing apparatus according to a second embodiment.

FIG. 5 is a block diagram showing a configuration of the image capturing apparatus according to the second embodiment. This configuration differs from the configuration of FIG. 1 in that the line memory 17 is composed of line memories 17a and 17b and a subtractor 17c for one-dimensional dark shading data. As other components are similar to those shown in FIG. 1, a description thereof will be omitted.

Figure 6:
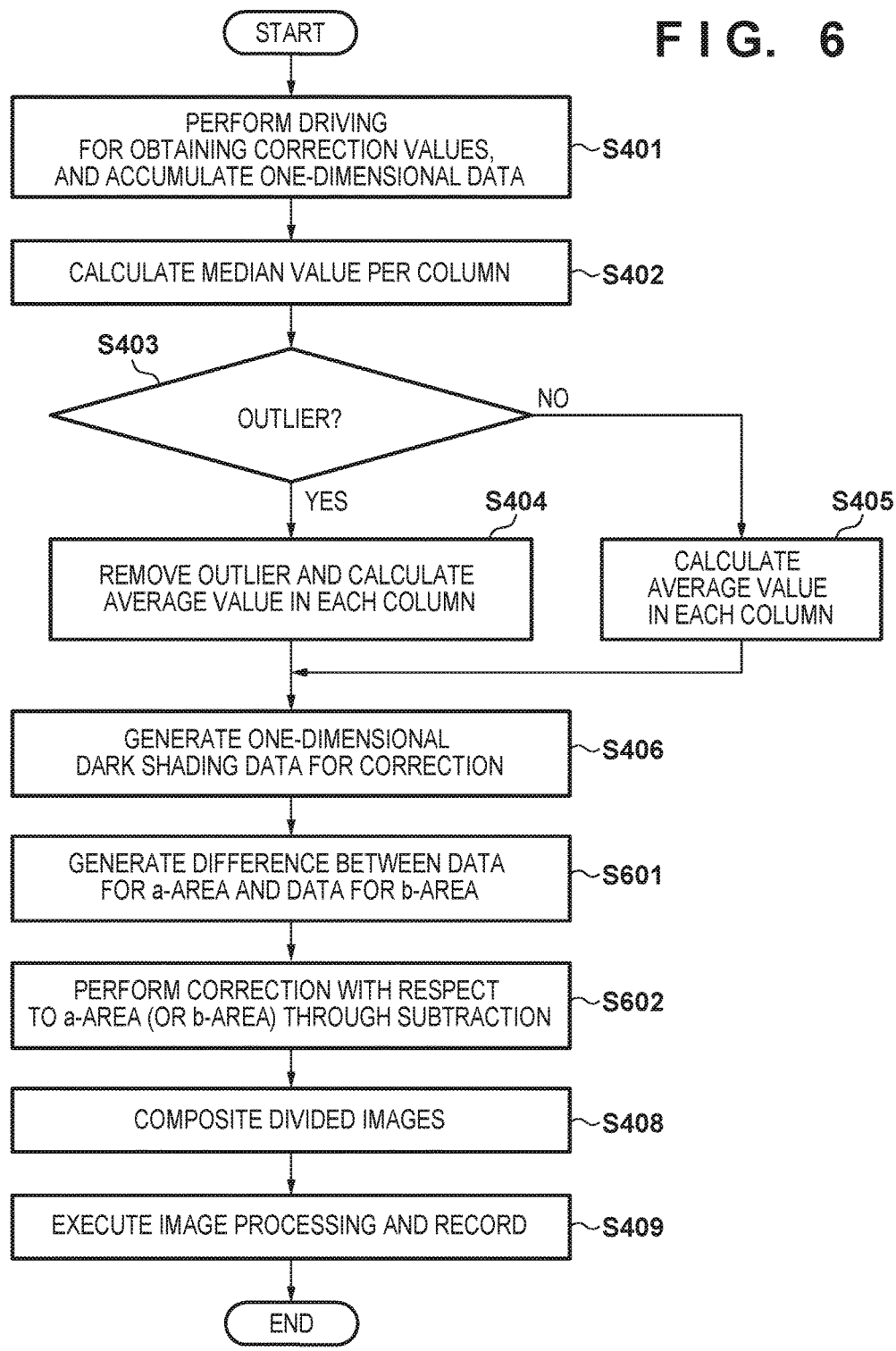
FIG. 6 is a flowchart of correction processing executed by the image capturing apparatus according to the second embodiment.

FIG. 6 is a flowchart of an example of correction processing executed by the image capturing apparatus according to the second embodiment. This flowchart differs from the flowchart of FIG. 4 in the following two aspects. First, in step S601, a difference between correction data for the a-area accumulated in the line memory 17a and correction data for the b-area accumulated in the line memory 17b is generated. Then, in step S602, image signals of the a-area that have been output from the horizontal signal line HLa, or image signals of the b-area that have been output from the horizontal signal line HLb, are corrected by subtracting the difference therefrom. As approximately half of image signals are corrected by subtracting the difference therefrom as described above, the load on and power consumption of processing executed by the image processing unit 13 can be reduced.

In the second embodiment also, the driving for obtaining the correction values may be performed with the transfer signal PTX placed into an ON state by time t4, as long as it is performed after light shielding by the mechanical shutter included in the imaging optical system 10 of the image capturing apparatus, or before the start of exposure.

Third Embodiment

A third embodiment of the present invention will now be described. The third embodiment differs from the above-described first and second embodiments in that the image sensor 11 performs processing through to correction that uses pixels at the border set for the vertical signal lines VLaq and VLbq, that is, the border of divided areas.

Figure 7:
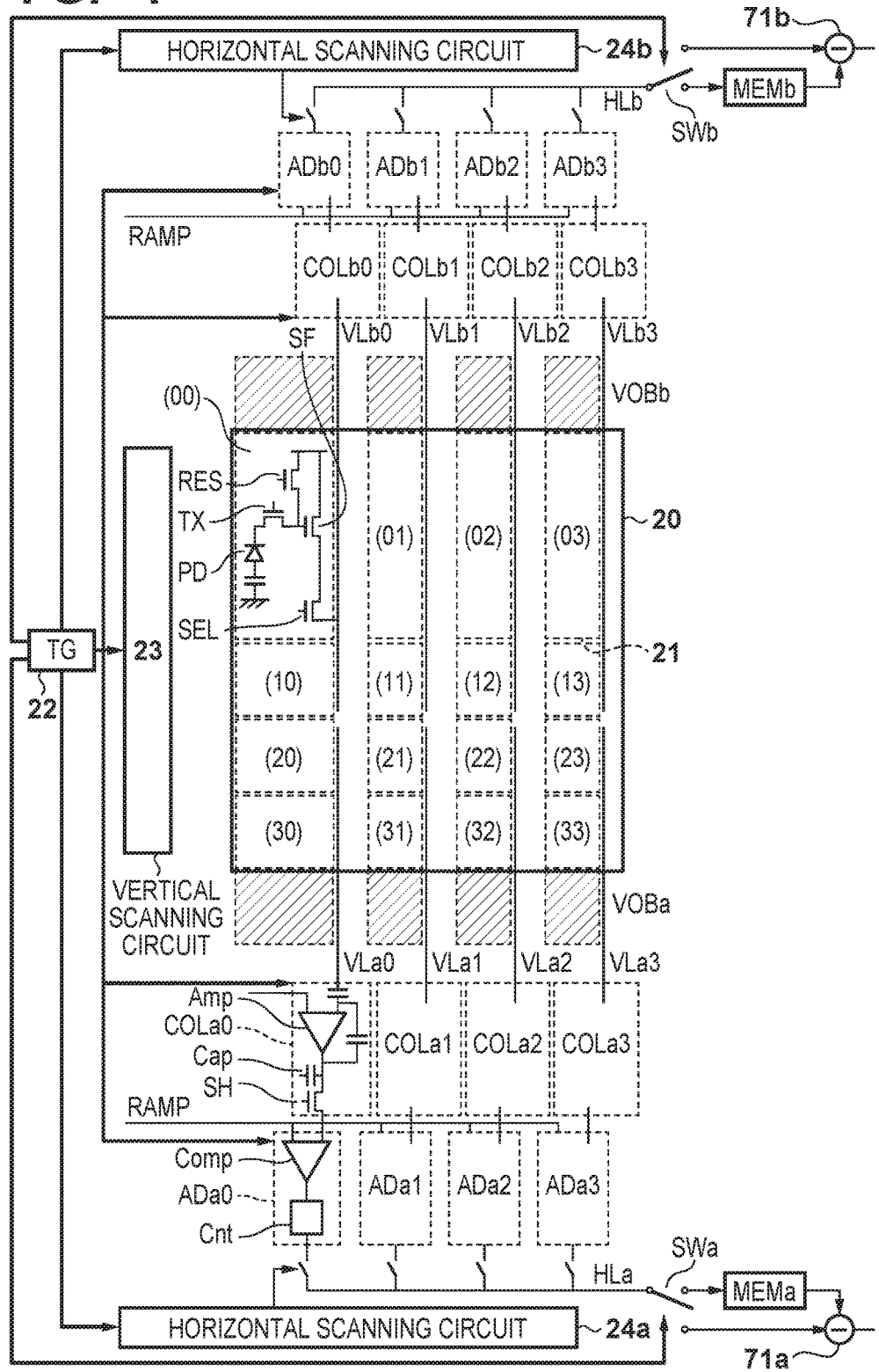
FIG. 7 is a block diagram showing a configuration of an image sensor according to a third embodiment.

FIG. 7 is a block diagram showing a configuration of the image sensor 11 according to the third embodiment. The configuration of FIG. 7 differs from the configuration of FIG. 2 in including line memories MEMa and MEMb, subtraction circuits 71a and 71b, and switches SWa and SWb. As other components are similar to those shown in FIG. 2, they will be given the same reference numbers and signs thereas, and a description thereof will be omitted.

One-dimensional dark shading data is accumulated in the line memories MEMa and MEMb. The subtraction circuits 71a and 71b subtract, from image signals that have been obtained through the normal readout driving, one-dimensional dark shading data that has been accumulated or has undergone predetermined outlier processing described in the first embodiment. Under control of the TG 22, the switches SWa and SWb perform a switchover operation to select terminals connected to the line memories MEMa and MEMb during the driving for obtaining the correction values, and select terminals connected to the subtraction circuits 71a and 71b during the normal readout driving.

This configuration enables the image sensor 11 to execute correction processing for rendering the border set for the vertical signal lines VLaq and VLbq, that is, the border of divided areas, unnoticeable.

As a method of driving the image sensor 11 according to the present third embodiment is the same as that according to the first embodiment described with reference to FIG. 3, a description thereof will be omitted.

In the third embodiment also, the driving for obtaining the correction values may be performed with the transfer signal PTX placed into an ON state by time t4, as long as it is performed after light shielding by the mechanical shutter included in the imaging optical system 10 of the image capturing apparatus 1, or before the start of exposure.

Fourth Embodiment

Figure 8:
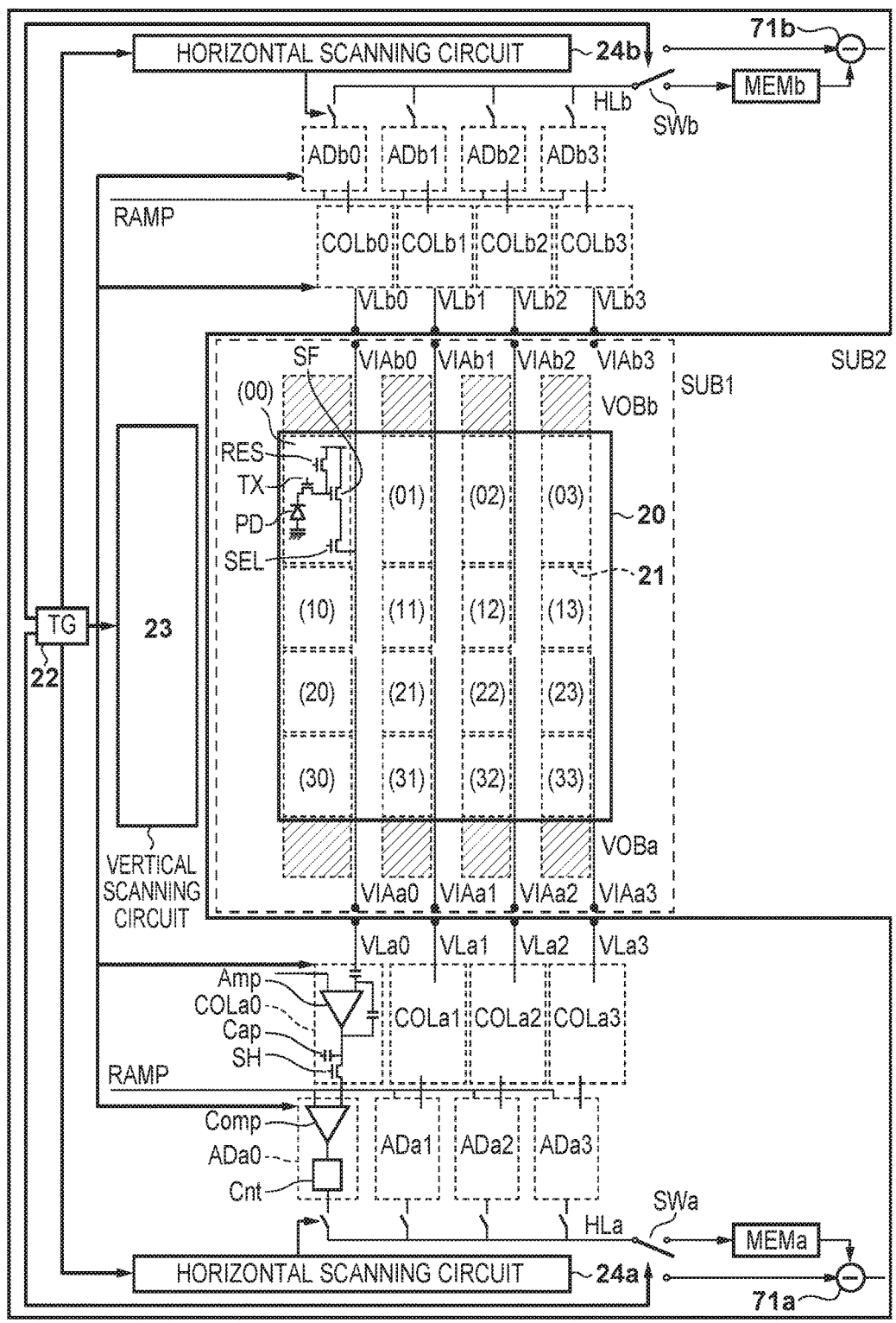
FIG. 8 is a block diagram showing a configuration of an image sensor according to a fourth embodiment.

A fourth embodiment of the present invention will now be described. FIG. 8 is a block diagram showing an example of a configuration of the image sensor 11 according to the fourth embodiment. The image sensor 11 according to the present embodiment differs from that according to the third embodiment in that the image sensor 11 is divided into two parts that are respectively configured on two semiconductor substrates SUB1 and SUB2. The semiconductor substrate SUB1 (a dash line in the figure) includes the aperture pixel area 20 and the optical black pixel regions VOBa and VOBb. On the other hand, the semiconductor substrate SUB2 includes the column circuits COLaq and COLbq, AD conversion circuits ADaq and ADbq, vertical scanning circuit 23, horizontal scanning circuits 24a and 24b, line memories MEMa and MEMb, subtraction circuits 71a and 71b, and so forth. For example, the two semiconductor substrates SUB1 and SUB2 are stacked and electrically connected by through electrodes VIAa1 to VIAa3 and VIAb1 to VIAb3 on the vertical signal lines VLaq and VLbq. These through electrodes are, for example, through-silicon via (TSV).

Application of finer semiconductor processes to the semiconductor substrate SUB2 than to the semiconductor substrate SUB1, which includes the pixels 21, will further increase room for an arrangement of the line memories MEMa and MEMb and the subtraction circuits 71a and 71b. The increased room can be used to newly add a more advanced circuit for processing outliers of one-dimensional dark shading data accumulated in the line memories MEMa and MEMb.

Although electrical connection is established by the through electrodes VIA on the vertical signal lines VLaq and VLbq in the fourth embodiment, this is merely an example. The elements (vertical signal lines, column circuits, AD conversion circuits, etc.) included in the separate semiconductor substrates connected by the through electrodes VIA may be determined in an arbitrary manner.

For example, although each vertical signal line is divided into two wires in the up-down direction in the first to fourth embodiments described above, the present invention is also applicable to a case in which each vertical signal line is divided into three wires or more in the up-down direction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-110215, filed on Jun. 1, 2016 which is hereby incorporated by reference herein in its entirety.

What is claimed is:
1. An image capturing apparatus comprising:
a pixel area composed of a plurality of pixels arranged in a matrix;
a plurality of output circuits that apply preset processing to signals which are read out in parallel from a plurality of divided areas obtained by dividing the pixel area in a column direction and output the processed signals;
a controller that performs control to execute first driving multiple times for reading out signals for obtaining correction data from each of the divided areas to the output circuits, and second driving for reading out image signals from the divided areas to the output circuits;
a correction circuit that obtains the correction data from the signals which are read out through the first driving, and corrects the image signals using the correction data; and
a memory that stores area-to-area differences in the correction data obtained from the divided areas,
wherein the controller executes the first driving with respect to pixels in a part of rows that includes a row at a border of the divided areas,
the correction circuit obtains the correction data by, for each column, removing one or more outliers of the signals that have been read out multiple times, and averaging a remainder of the signals, and the correction circuit corrects the image signals obtained from the divided areas using the area-to-area differences in the correction data.

2. The image capturing apparatus according to claim 1, wherein for each of the divided areas, the correction circuit corrects the image signals obtained from the area using the correction data obtained from the area.

3. The image capturing apparatus according to claim 1, wherein the correction circuit obtains the correction data by, for each column, removing one or more outliers of the signals that have been read out multiple times, and averaging a remainder of the signals.

4. The image capturing apparatus according to claim 1, further comprising a shield that shields the pixel area from light,
wherein the controller controls to execute the first driving while the shield is shielding the pixel area from light.

5. The image capturing apparatus according to claim 1, wherein
each pixel includes a photoelectric converter and a transfer circuit that transfers charge generated by the photoelectric converter to a corresponding one of the output circuits, and
in the first driving, signals are read out without causing the transfer circuits to transfer the charges.

6. The image capturing apparatus according to claim 5, wherein
in the first driving, the readout of the signals is performed twice at an interval of a preset period, and the correction circuit obtains the correction data based on differences between the signals read out in the first readout and the signals read out in the second readout, and
after the preset period after the readout of the signals without causing the transfer circuits to transfer the charges, the image signals are read out through the second driving along with transfer of the charges by the transfer circuits.

7. The image capturing apparatus according to claim 6, wherein the correction circuit corrects a result of subtracting the signals read out in the first readout from the image signals.

8. The image capturing apparatus according to claim 6, wherein the output circuits each include a plurality of analog-to-digital conversion circuits that are provided in one-to-one correspondence with columns, and obtain the differences between the signals by performing counting down in the first readout and counting up in the second readout.

9. An image sensor comprising:
a pixel area composed of a plurality of pixels arranged in a matrix;
a plurality of output circuits that apply preset processing to signals which are read out in parallel from a plurality of divided areas obtained by dividing the pixel area in a column direction and output the processed signals;
a controller that performs control to execute first driving multiple times for reading out signals for obtaining correction data from each of the divided areas to the output circuits, and second driving for reading out image signals from the divided areas to the output circuits; and
a plurality of correction circuits that are provided in one-to-one correspondence with the divided areas, that obtain the correction data from the signals which are read out through the first driving, and correct the image signals using the correction data,
wherein the controller executes the first driving with respect to pixels in a part of rows that includes a row at a border of the divided areas,
the plurality of correction circuits obtain the correction data by, for each column, removing one or more outliers of the signals that have been read out multiple times, and averaging a remainder of the signals, and
the plurality of correction circuits correct the image signals obtained from the divided areas using area-to-area differences in the correction data obtained from the divided areas.

10. The image sensor according to claim 9, wherein
each pixel includes a photoelectric converter and a transfer circuit that transfers charge generated by the photoelectric converter to a corresponding one of the output circuits, and
in the first driving, signals are read out without causing the transfer circuits to transfer the charges.

11. The image sensor according to claim 10, wherein
in the first driving, the readout of the signals is performed twice at an interval of a preset period, and the correction circuits obtain the correction data based on differences between the signals read out in the first readout and the signals read out in the second readout, and
after the preset period after the readout of the signals without causing the transfer circuits to transfer the charges, the image signals are read out through the second driving along with transfer of the charges by the transfer circuits.

12. The image sensor according to claim 11, wherein the plurality of correction circuits correct a result of subtracting the signals read out in the first readout from the image signals.

13. The image sensor according to claim 11, wherein the output circuits each include a plurality of analog-to-digital conversion circuits that are provided in one-to-one correspondence with columns, and obtain the differences between the signals by performing counting down in the first readout and counting up in the second readout.

14. The image sensor according to claim 9, wherein
the pixel area is configured on a first substrate, and
the output circuits, the controller, and the plurality of correction circuits are configured on a second substrate.

15. The image sensor according to claim 14, wherein the first substrate and the second substrate are stacked.

16. A control method for an image capturing apparatus provided with an image sensor that includes a pixel area and a plurality of output circuits, the pixel area being composed of a plurality of pixels arranged in a matrix, the output circuits applying preset processing to signals which are read out in parallel from a plurality of divided areas obtained by dividing the pixel area in a column direction and outputting the processed signals, the control method comprising:
controlling to execute first driving multiple times for reading out signals for obtaining correction data from each of the divided areas to the output circuits, and second driving for reading out image signals from the divided areas to the output circuits; and
obtaining the correction data from the signals which are read out through the first driving, and correcting the image signals using the correction data,
wherein in the control, the first driving is executed with respect to pixels in a part of rows that includes a row at a border of the divided areas, the correction data is obtained by, for each column, removing one or more outliers of the signals that have been read out multiple times, and averaging a remainder of the signals, and the image signals obtained from the divided areas are corrected using area-to-area differences in the correction data obtained from the divided areas.

17. A control method for an image sensor that includes a pixel area and a plurality of output circuits, the pixel area being composed of a plurality of pixels arranged in a matrix, the output circuits applying preset processing to signals which are read out in parallel from a plurality of divided areas obtained by dividing the pixel area in a column direction and outputting the processed signals, the control method comprising:

performing control to execute first driving multiple times for reading out signals for obtaining correction data from each of the divided areas to the output circuits, and second driving for reading out image signals from the divided areas to the output circuits; and for each of the divided areas, obtaining the correction data from the signals which are read out through the first driving, and correcting the image signals using the correction data, wherein in the control, the first driving is executed with respect to pixels in a part of rows that includes a row at a border of the divided areas, the correction data is obtained by, for each column, removing one or more outliers of the signals that have been read out multiple times, and averaging a remainder of the signals, and the image signals obtained from one of the divided areas are corrected using area-to-area differences in the correction data obtained from the divided areas.

18. An image capturing apparatus comprising:

a pixel area composed of a plurality of pixels arranged in a matrix;

a plurality of output circuits that apply preset processing to signals which are read out in parallel from a plurality of divided areas obtained by dividing the pixel area in a column direction and output the processed signals;

a controller that performs control to execute first driving for reading out signals for obtaining correction data from the divided areas to the output circuits, and second driving for reading out image signals from the divided areas to the output circuits; and a correction circuit that obtains the correction data from the signals which are read out through the first driving by removing one or more outliers of the signals, and corrects the image signals using the correction data, wherein the controller executes the first driving with respect to pixels in a part of rows that includes a row at a border of the divided areas, the correction circuit obtains the correction data by, for each column, removing one or more outliers of the signals that have been read out multiple times, and averaging a remainder of the signals, and the correction circuit corrects the image signals obtained from the divided areas using area-to-area differences in the correction data obtained from the divided areas.

* * * * *